United States Patent [19]

O'Neal

[11] 4,225,682
[45] Sep. 30, 1980

[54] SULFUR MODIFIED POLYCHLOROPRENE WITH IMPROVED STORAGE STABILITY

[75] Inventor: Hubert R. O'Neal, Houston, Tex.

[73] Assignee: Denka Chemical Corporation, Houston, Tex.

[21] Appl. No.: 908,384

[22] Filed: May 22, 1978

Related U.S. Application Data

[63] Continuation of Ser. No. 686,378, May 14, 1976, abandoned, which is a continuation-in-part of Ser. No. 591,289, Jun. 30, 1975, abandoned.

[51] Int. Cl.$^2$ ............................................. C08L 51/04
[52] U.S. Cl. ......................................... 525/76; 525/82; 525/83; 525/215; 525/226; 525/291; 525/305; 525/343; 525/350; 525/351; 525/383
[58] Field of Search .......................... 260/890, 876 R; 526/295; 525/76, 82, 83, 215, 226, 291, 305

[56] References Cited

U.S. PATENT DOCUMENTS

| | | | |
|---|---|---|---|
| 2,234,215 | 3/1941 | Youker | 526/295 |
| 3,300,433 | 1/1967 | Opotheker | 526/295 |
| 3,655,827 | 4/1972 | Finlay et al. | 260/890 |
| 3,692,875 | 9/1972 | Jennes et al. | 260/890 |
| 3,808,173 | 4/1974 | Orihashi | 526/295 |
| 3,849,519 | 11/1974 | Kadowaki et al. | 260/890 |
| 3,923,763 | 12/1975 | Edmondson | 526/295 |
| 4,035,446 | 7/1977 | Hoff, Jr. | 260/890 |

Primary Examiner—J. Ziegler
Attorney, Agent, or Firm—Kenneth H. Johnson

[57] ABSTRACT

Elemental sulfur modified polychloroprene rubbers having improved Mooney viscosity stability are prepared by blending a sol and a gel in a weight ratio of sol:gel of from 98:2 to 60:40 based on solids, wherein the gel contains 0.5 to 5 weight percent of a cross-linking agent comonomer, a trihydric ester of the general formula

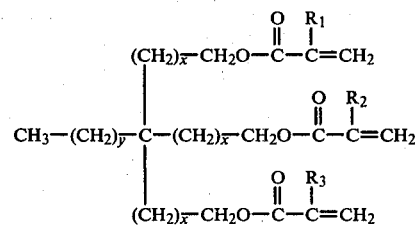

wherein x is 0 or an integer of from 1 to 4 and is preferably 0; y is 0 or an integer of from 1 to 4 and preferably 1; $R_1$, $R_2$ and $R_3$ represent hydrogen or an alkyl radical with from 1 to 4 carbon atoms and is preferably $CH_3$.

13 Claims, No Drawings

SULFUR MODIFIED POLYCHLOROPRENE WITH IMPROVED STORAGE STABILITY

This application is a continuation of Ser. No. 686,378 filed May 14, 1976, which is a continuation-in-part of Ser. No. 591,289 filed June 30, 1975, both abandoned.

BACKGROUND OF THE INVENTION

The present invention relates to polychloroprene rubber compositions modified with elemental sulfur.

Various modifiers containing sulfur are used to produce different types of polychloroprene, each type having somewhat different and desirable properties from the other types. For example, polychloroprene sulfur modifiers include elemental sulfur, mercaptans, xanthogens and polysulfides. The types containing elemental sulfur cure rapidly without acceleration, and with milling they break down to a greater extent than other types which is useful in achieving workable viscosity in highly loaded stocks with a minimum of plasticizer.

The polychloroprene prepared with elemental sulfur also is desirable since it has less shrinkage than the other types and sheets out better.

Vulcanizates of the elemental sulfur modified polychloroprene are superior in tear strength, resilience, elongation and adhesion to natural rubber and SBR to other polychloroprenes.

A problem, however, with the elemental sulfur modified polychloroprenes has been the lack of stability of the raw polymer. This has resulted in significant loss of Mooney viscosity of these compounds during storage.

Polychloroprene blends, having improved processing characteristics, have been developed by blending polychloroprenes which are benzene-soluble, referred to as "sols", with polychloroprenes which are benzene-insoluble, referred to as "gels". The resulting blends are frequently referred to as "easily processable" blends. Examples of these blends may be found in U.S. Pat. Nos. 3,042,652; 3,147,317; 3,147,318; and U.S. Pat. No. 3,655,827, which disclosed that superior blends are prepared from sols having dialkyl xanthogen disulfides as modifying or chain-transfer agents and gels having cross-linking monomers containing two or more polymerizable double bonds.

The examples of U.S. Pat. No. 3,655,827, issued to Joseph B. Finley et al, demonstrated the substantial superiority of the easily processable rubbers, wherein the sol contained the dialkyl xanthogen disulfides and the gels contained ethylene dimethacrylate as compared to easily processable blends, wherein the sol was made with dodecyl mercaptan and the gel was made with the ethylene dimethacrylate. Thus, in order to take advantage of the invention as disclosed and taught by Finley et al, one must use the dialkyl xanthogen disulfides and thereby forego those sol polymers produced, for example, with the older mercaptans. In commonly assigned copending application Ser. No. 498,067, filed Aug. 16, 1974, it was disclosed that a copolymerizable monomer comprising a triester of a triol and unsaturated acids used in the gel will provide the same degree of benefit as Finley et al observed, but without the necessity of using a dialkyl xanthogen disulfide as Finley et al.

It is a feature of the present invention that the advantages of polychloroprene modified with elemental sulfur are obtained with improved raw polymer stability, particularly, Mooney viscosity. Surprisingly, an excellent blend rubber based on a sulfur modified sol was discovered.

SUMMARY OF THE INVENTION

Briefly stated, the present invention is a polychloroprene sol-gel blend elastomer composition comprising an intimate mixture of a benzene-soluble polymer prepared by polymerizing chloroprene in aqueous emulsion containing the chloroprene and elemental sulfur and peptizing the polymerization product to obtain a benzene-soluble polymer, and a benzene-insoluble polymer of chloroprene prepared by having present in the polymerization system a monomer having the general formula

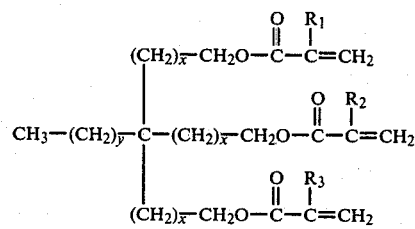

wherein x is 0 or an integer of from 1 to 4 and is preferably 0; y is 0 or an integer of from 1 to 4 and preferably 1; $R_1$, $R_2$ and $R_3$ represent hydrogen or an alkyl radical with from 1 to 4 carbon atoms and is preferably $CH_3$.

DETAILED DESCRIPTION OF THE PREFERRED EMBODIMENTS

The sol component may be prepared by technicques such as disclosed in U.S. Pat. Nos. 1,950,436; 2,227,517; 2,321,693; 2,371,719; 2,463,009; 2,831,842; 2,914,497; 3,042,652; 3,147,318; 3,147,317; 3,655,827; British Pat. Nos. 1,237,750 and 1,158,970. Process and methods for the polymerization of chloroprene are disclosed, for example, in Encyclopedia of Polymer Science and Technology, Vol. 3, p. 705–730, Interscience, 1965.

Sol Preparation

Comonomers may be employed with the selection and quantities of comonomer being chosen to produce a sol polymer. In this application, the term "polymers of chloroprene" encompasses polymers in which chloroprene is the major monomer. Examples of comonomers are 2,3-dichloro-1,3-butadiene; acrylonitrile; methyl methacrylate, and other esters, amides, nitriles, vinyl aromatic compounds such as styrene, aliphatic conjugated diolefins such as isoprene, vinyl ethers such as methyl vinyl ether. Usually the total amount of comonomers will represent no greater than 25 mol percent of the total monomers and preferably will constitute less than 15 mol percent of the total monomers including chloroprene.

The polymerization is carried out in an aqueous system and may be batch or continuous processes. Emulsifiers may be employed, such as the salts of rosins and rosin derivatives such as wood rosin, disproportionated rosin or hydrogenated rosin; tall oil rosin; ammonium, sodium or potassium salts of long-chain fatty acids; alkaline and alkaline earth salts of the condensate of formaldehyde and naphthalene sulfonic acid; octyl sulfate salts; nonionic surface active agents such as the ethylene oxide or propylene oxide condensation products. Additional emulsifying agents are disclosed in U.S. Pat. No. 2,264,173.

The pH of the aqueous emulsion for polymerization may be varied and can be acidic, neutral or alkaline; however, it is preferred to have a pH in the alkaline range of about 7 to 13.5.

Conventional catalysts for chloroprene polymerization may be employed and preferred catalysts are peroxide catalysts of the organic or inorganic type. Examples of organic peroxides are benzoyl peroxide, cumene hydroperoxide, tertiary-butyl isopropylbenzene hydroperoxide, azo catalysts such as alpha-alpha'-azo-bis-isobutyronitrile and the like. Suitable inorganic peroxides are salts of inorganic per acids including persulfates, perborates or percarbonates, e.g., ammonium or potassium persulfate and hydrogen peroxide in a redox catalyst system with, for example, sodium 2-anthraquinone sulfonate. The catalyst may be used in amounts required to bring about polymerization at any desired rate with suitable ranges being from 0.110 to 0.5 parts by weight per 100 parts of polymerizable monomer. Sulfur may be employed in the emulsion in the range from 0.10 to 3 parts by weight per 100 parts of total monomer with the range of about 0.25 to 0.6 being especially preferred.

The polymer product produced with the elemental sulfur modifier as those of ordinary skill in the art appreciate, is a substantially benzene-insoluble polymer. As shown in the examples, conventional peptization of of the benzene-insoluble polymer produces the benzene-soluble component of the present sol-gel blends.

Peptization, also known as plasticizing has long been employed to change the gel characteristic of sulfur modified neoprene by scission of or breaking of the polymer chains into shorter chains, thereby "plastizing" the polymer. In addition to those peptizing agents disclosed in the examples, other well known peptizing agents include generally compounds containing the nucleus

> [(N)(S)]=C—S— which group is characterized by having a central carbon, one of the valences of which is satisfied by a sulfur atom and the other three valences of which are satisfied by a nitrogen atom and a sulphur atom together. Typical members of this group of compounds which serve to exemplify the class are as follows: phenylethyl-carbamyl-dimethyl-dithiocarbamate; dimethyl-thiocarbamyl-thioacetyl sulphide; dimethyl-thiocarbamyl-nitrophenyl-disulphide; benzothiazyl-dimethyl-dithiocarbamate; benzothiazyl-dimethyl-carbamyl-sulphide; benzothiazyl-furoylsulphide; mercapto-benzo-thiazol; tetrabutyl-thiuram-monosulphide; tetramethyl-thiuram-disulphide; dipentamethylene-thiuram-tetrasulphide; dimethyl carbamyl dimethyl dithiocarbamate; dinitro phenyl pentamethylene dithiocarbamate; tetraethyl thiuram disulphide; dipentamethylene thiuram disulphide; benzyl pentamethylene dithiocarbamate; diphenyl diethyl thiuram disulphide; phenyl dibutyl dithiocarbamate; tolyl phenyl ethyl dithiocarbamate; b-phenyl ethyl xylyl methyl dithiocarbamate; p-diphenyl diisoamyl dithiocarbamate; propyl dicetyl dithiocarbamate; crotonyl dicylohexyl dithiocarbamate; cetyl naphthyl methyl dithiocarbamate; b-naphthyl dipropyl dithiocarbamate; decyl benzyl ethyl dithiocarbamate; benzoyl diethyl dithiocarbamate; acetyl phenyl methyl dithiocarbamate; dibutyl carbamyl phenyl propyl dithiocarbamate; p-acetyl phenyl sulphur diallyl dithiocarbamate; 2-chloro-1-naphthyl sulphur dimethyl dithiocarbamate; dinaphthyl dimethyl thiuram monosulphide; dichlor diphenyl diethyl thiuram monosulphide; dinitro diphenyl dipropyl thiuram monosulphide; phenyl sodium sulphonate diethyl dithiocarbamate; nitro ortho diphenyl dimethyl dithiocarbamate; dipenthamethylene thiuram monosulphide; nitro naphthyl pentamenthylene dithiocarbamate; dinitro diphenyl dibutyl thiuram disulphide; distearyl dimethyl thiuram disulphide; tetracetyl thiuram disulphide; dinaphthyl dimethyl thiuram disulphide; tetraisopropyl thiuram tetra sulphide; tetrabrom diphenyl dimethyl thiuram tetra sulphide; tetrabutyl thiuram disulphide; potassium nitro benzothiazyl mercaptide; ammonium chloro nitro benzothiazyl mercaptide; ethyl benzothiazyl sulphide; cetyl benzothiazyl sulphide; crotonyl benzothiazyl sulphide; benzyl benzothiazyl sulphide; tolyl benzothiazyl sulphide; dinitro phenyl benzothiazyl sulphide; dibrom phenyl benzothiazyl sulphide; b-naphthyl benzothiazyl sulphide; nitro p-diphenyl benzothiazyl sulphide; benzoyl benzothiazyl sulphide; acetyl benzothiazyl sulphide; methyl tolyl carbamnyl benzothiazyl sulphide; phenyl benzothiazyl disulphide; tetrabutyl thiocarbamyl benzothiazyl sulphide; chloro phenyl propyl thiocarbamyl nitro benzothiazyl sulphide; dinitro dibenzothiazyl disulphide; nitro dibenzothiazyl disulphide and chlor dinitro dibenzothiazyl disulphide.

Gel Preparation

The gel or benzene insoluble polymer may be produced by the general techniques to produce the gel polymer such as disclosed in U.S. Pat. Nos. 3,147,317; 3,147,318 and 3,655,827. Normally, to obtain a gel the percent conversion will be high, such as from about 80 or 85 to 100 percent. In order to obtain a gel, peroxy compounds may be used as disclosed in U.S. Pat. No. 3,147,318, or radiation may be employed as disclosed in U.S. Pat. No. 3,042,652. In general, the same methods of polymerization described above for the preparation of the sol polymer may be employed so long as the technique is varied to obtain a gel or crossiinked polymer, i.e., the emulsifiers, temperature of polymerization range, catalysts, pH, proportions of reactants and so forth, as described above, may be employed. Mercaptan or dialkyl xanthogen disulfides can be employed, e.g., as exemplified in U.S. Pat. No. 3,655,827.

The gel polymer is prepared employing as a comonomer a trihydric ester of the general formula

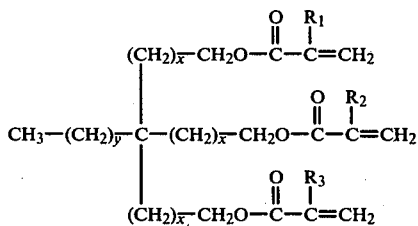

wherein x, y, $R_1$, $R_2$ and $R_3$ have the significance given above. The preferred trihydric alcohol is trimethylol propane. Examples of suitable compounds are the trimethacrylic, or mixed esters of methacrylic acids of trimethylol propane, trimethylol butane, trimethylol pentane, trimethylol hexane, trimethylol heptane; dimethylol monobutylol butane or dimethylol monopentylol propane. A preferred comonomer is the trimethacrylic esters of trimethylolpropane.

In addition to the trihydric ester, the other comonomers may be additionally employed with the types of monomers being the same as described for the preparation of the sol polymer. The total comonomer in the gel will be less than 50 weight percent of the total monomers and the total amount of triester will be no greater than 20 weight percent of total monomers such as from about 0.5 to 20 weight percent with a preferred range being no greater than about 10 weight percent such as from about 0.5 to about 10 weight percent of total monomers. One of the advantages of this invention is that 5 percent or less of triester is effective as an excellent cross-linking agent, e.g., from 0.5 to 5 weight percent more preferably 1.5 to 3 percent.

The gel polymer is normally obtained at monomer conversions such as at least 80 percent or 90 percent, but this can be varied so long as gel polymer is obtained.

It has been found that the presence of some modifier or chain-transfer agent as described in the gel is essential to obtaining greatest improvement in results when employing the cross-linking monomers of the present invention. Generally, about 0.09 to 1.5 parts per hundred parts of total monomer by weight would be employed, depending on chain-transfer agent and the other variables in the polymerization process. The usual modifiers or other agents may be present in the emulsion. For instance, the polymerization may be carried out in the presence of sulfur to produce a sulfur modified polychloroprene. Also, chain-transfer agents may be employed such as the alkyl mercaptans, e.g., dodecyl mercaptan, iodoform, benzyl iodide and dialkyl xanthogen disulfides, e.g., diisopropyl xanthogen disulfide and polysulfide compounds, e.g., i-propyl (o-ethyl dithiocarbonoxy) sulfide. Preferred modifiers are mercaptans and dialkyl xanthogen disulfides with from 0.10 to 3 parts by weight per 100 parts of total monomer with the range of about 0.25 to 0.6 being especially preferred.

A particularly valuable group of chain-transfer agents are the polysulfide compounds noted above. The polysulfides have the formula

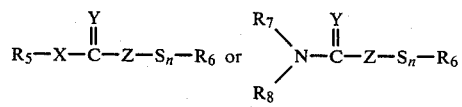

wherein X, Y and Z are selected from the group consisting of oxygen and sulfur, $R_5$ is a hydrocarbon radical having from 1 to 8 carbon atoms, $R_6$ is a hydrocarbon radical having from 1 to 8 carbon atoms or is a radical the same as

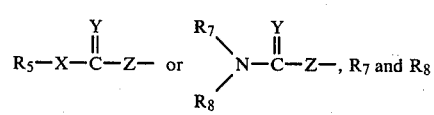

are selected from the group consisting of hydrocarbon radicals having from 1 to 8 carbon atoms or hydrogen with at least one of $R_7$ and $R_8$ not being hydrogen and n is 1 to 4. Compounds of this type may be formed, e.g., as disclosed in Twiss, D., *JACS* 49, February 1927, p. 491-494. The hydrocarbon radicals can be acyclic, cycloaliphatic, aromatic or combinations thereof. For example, the radicals can be methyl, ethyl, n-propyl, isopropyl, n-butyl, isobutyl, n-pentyl, 2-ethyl hexyl, cycloaliphatic radicals having 5 or 6 carbons aryl radicals such as phenyl, alkaryl radicals such as methylphenyl, combinations thereof and so forth. Examples of polysulfide compounds which are di(o-ethyl dithiocarbonoxy)sulfide, di(o-ethyl dithiocarbonoxy)disulfide, o-isopropyl, o-ethyl dithiocarbonoxy disulfide and so forth. Particularly useful polysulfides are those having the general structure

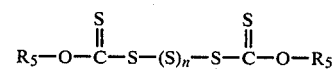

wherein $R_5$ and n have the significance noted above. Particularly preferred are polysulfides of the structure

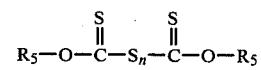

wherein n is 3 to 4, such as di(o-isopropyl dithiocarbonoxy)sulfide.

The usual methods may be employed to prepare an aqueous emulsion of the monomeric material and emulsifying agent and water. The proportions are not critical, but generally, the monomer will be present in an amount such as from 30 to 60 percent by weight based on the total weight of the composition. The temperature of polymerization may be varied with suitable ranges being from 0° to 90° C. with the preferred range being between 15° C. and 55° C. The polymerizations may be short-stopped by the addition of agents such as paratertiary-butyl catechol and thiodiphenylamine.

The gel and sol polymers can be blended in a conventional manner as described, for example, in U.S. Pat. No. 3,147,317 and U.S. Pat. No. 3,655,827 to give an intimate mixture. A preferred method is to thoroughly blend the latices and then isolate as by coagulation or drying. The blends may also be accomplished by isolating the polymers separately and then intimately blending the isolated polymers. The polymers may be blended, e.g., in a weight ratio of sol to gel of from 98:2 to 20:80 with better results normally obtained at sol to gel ratios of from about 98:2, preferably at least about 95:5 to 60:40 and most preferably about 80:20 to 60:40 based on solids.

The gel-sol blends can be cured by conventional means such as disclosed in chapters II and III of "The Neoprenes" by R. M. Murray et al (1963). The cured compositions are useful such as for wire coatings.

EXAMPLES 1 AND 2

Example 1

In these examples an elemental sulfur modified, high Mooney viscosity polychloroprene was blended with a gel as specified to produce an elemental sulfur modified polychloroprene with improved Mooney stability. Table I is the recipe for the unblended elemental sulfur modified polychloroprene of Example 1. (Control)

EXAMPLE 2

The sol in the sol/gel (3/1) blend was a portion of the Example 1 latex separated before the antioxidant was added and peptized in the same manner, but without the antioxidant. The gel of the blend was prepared by the recipe in Table II. The polymerization was carried out under a nitrogen blanket at 40° C. to the desired conversions by controlling the rate at which catalyst was added. Catalyst is an aqueous solution which is 0.07% in sodium 2-anthraquinone sulfonate and 0.36% in potassium persulfate. After reaching the desired conversion, polymerization was stopped by adding an emulsion containing 0.01 parts per hundred total monomer (phtm) each of phenothiazine and 4-tertiary-butyl pyrocatechol. The latex was then steam stripped of unreacted monomer. The latex is then acidified to a pH of 6.3 using a 10% acetic acid solution and isolated by freeze roll.

The physical properties of the standard sulfur modified polychloroprene (Example 1) and the sulfur modified sol/gel (3/1) blend in a carbon black compound were compared. (Table III) It can be seen that the blend is superior in many respects, including Mooney viscosity on aging and die swell. The carbon black formulation was:
- Rubber—100.0
- PANA*—2.0
- MgO—4.0
- Stearic Acid—0.5
- Carbon Black—29.0
- ZnO—5.0

*phenyl-α-naphthylamine

The results of the physical tests are set forth in Table III.

TABLE 1
S-POLYCHLOROPRENE RECIPE

| | Parts by Weight |
|---|---|
| POLYMERIZATION CHARGE | |
| Water (total) | 150.000 |
| Sodium Hydroxide (100%) | 0.775 |
| Sodium Phosphate (Na$_3$PO$_4$) | 0.300 |
| Lomar-PW[2] | 0.718 |
| Chloroprene | 100.000 |
| Newport N-Wood Rosin | 5.000 |
| Sulfur | 0.500 |
| BHT | 0.100 |
| PUMPED CATALYST | |
| Water | (95.400) |
| Potassium Persulfate | 4.500 [1] |
| Silver Salt* | (0.115) |
| SHORTSTOP | |
| Water (total) | (3.399) |
| Dimethyl ammonium dimethyl dithiocarbamate | Variable |
| ACETIC ACID (10%) | Variable[3] |
| PEPTIZING AGENT | |
| Water (total) | 8.510 |
| Sodium Lauryl Sulfate (100%) | 0.150 |
| Chloroprene | 6.150 |
| Phenothiazine | 0.00123 |
| Tetraethylthiuram disulfide | 2.300 |
| ANTIOXIDANT - added during last 15 min. of peptizing | |
| Water (total) | 4.6300 |
| Sodium dodecyl benzene sulfonate | 0.0695 |
| Chloroprene | 2.7800 |
| Butylated hydroxytoluene (BHT) | 0.8500 |
| CONDITIONS | |
| Polymerization Temperature, °C. | 40 (104° F.) |
| Polymerization Time, Hrs. | 5 (approx.) |
| Conversion, % | 84 |
| Solids (at 40° C.) at Shortstop | 34.6 |
| Peptization | 5 hrs. at 40° C. + cooldown to less than 20° C. (68° F.) |
| Isolated by Freeze Roll | |

[1]These numbers represent a % mix and do not relate to amount. Catalyst is used in sufficient amount to maintain the reaction.
[2]Sodium salt of condensate of formaldehyde and naphthalene sulfonic acid.
[3]The pH of the latex is adjusted to 10.7 ± 0.05 prior to peptization.
*Sodium 2-anthraquinone sulfonate.

TABLE II
GEL RECIPE

| | |
|---|---|
| Chloroprene[1] | 97.000 |
| Diisopropyl xanthogen disulfide (DXD) | 1.000 |
| Trimethylol propane trimethacrylate (TPT) | 3.000 |
| Disproportionated rosin[2] | 3.047 |
| Butylated hydroxy toluene (BHT) | 0.100 |
| Water | 100.000 |
| Sodium hydroxide | 0.695 |
| Sodium salt of the condensate of naphthalene sulfonic acid and formaldehyde | 0.700 |
| Sodium sulfite | 0.300 |
| Monomer conversion % | 90 |

[1]Recipe quantities in parts per hundred total monomer (phtm)
[2]Hercules 731 - SA

TABLE III
PHYSICAL TESTING

| PROPERTY | EXAMPLE 1 | EXAMPLE 2 |
|---|---|---|
| Blend (sol/gel) | — | 3/1 |
| Raw Mooney ML1 + 2½/4 | 72/67 | 73/67 |
| Aged Mooney 70° C. | | |
| 3 days ML1 + 2½/4 | 32/31 | 43/39 |
| Compound Visc. ML1 + 2½/4 | 76/71 | 69/66 |
| Mooney Scorch, minutes | 48.4 | 43.4 |
| Hardness, Shore A | 59.0 | 60.5 |
| Modulus - 300%, psi | 1390 | 1675 |
| 500%, psi | 2750 | 2775 |
| Tensile, psi | 2940 | 3015 |
| % Elongation | 675 | 570 |
| Rheometer, 307° F. | | |
| Min. Torque, inch-pounds | 11.0 | 12.5 |
| Scorch 2 in/lb increase, minutes | 6.3 | 5.5 |
| T-40(Torque at 40 min.) inch-pounds | 87.0 | 90.0 |
| 80% Cure rate, minutes | 7.5 | 7.8 |
| Extrusion | | |
| Rate-in/min | 103.4 | 122.8 |
| Output gm/min | 52.5 | 52.4 |
| % Die Swell | 80.5 | 51.6 |

EXAMPLES 3 AND 4

In these examples the sulfur modified polychloroprene was prepared with a lower initial Mooney viscosity following the recipe of Table I and the gel was produced using 4 phtm TPT and 1.3 phtm DXD in the recipe of Table II. The sol was prepared as described in Example 2 and the sol/gel blend was 3/1. The same carbon black formulation as set forth in Examples 1 and 2 was employed, tested as before and the results recorded in Table IV.

TABLE IV
PHYSICAL TESTS

| PROPERTY | EXAMPLE 3 | EXAMPLE 4 |
|---|---|---|
| Blend (sol/gel) | 3/1 | — |
| Raw Mooney ML1 + 2½/4 | 46/43 | 68/62 |
| Aged Mooney 70° C. | | |
| *3 days ML1 + 2½/4 | 45/41 | 24/22 |
| Compound Visc. ML1 + 2½/4 | 52/50 | 45/43 |
| Mooney Scorch, minutes | 40.0 | 41.8 |
| Hardness, Shore A | 63.5 | 62.5 |
| Modulus-200%, psi | 1010 | 940 |
| 400%, psi | 2600 | 2350 |
| Tensile, psi | 3040 | 3060 |
| % Elongation, 307° F. | 480 | 550 |
| Rheometer | | |
| Min. Torque, inch-pound | 7.0 | 5.2 |
| Scorch 2 in/lb, increase, minutes | 4.7 | 6.0 |
| T-30 Max. (Torque at 30 minutes) inch-pounds | 47.7 | 47.0 |
| Opt. cure Tq/Time (inch- | 43.6/16.7 | 42.8/12.7 |

TABLE IV-continued
PHYSICAL TESTS

| PROPERTY | EXAMPLE 3 | EXAMPLE 4 |
|---|---|---|
| pounds/min.) | | |
| Extrusion | | |
| Rate-in/min | 124.5 | 104.4 |
| Output gm/min. | 52.3 | 53.3 |
| % Die Swell | 49.4 | 81.4 |

*Approximately equivalent to 2 years of storage under normal conditions.

EXAMPLES 5, 6 AND 7

These examples demonstrate that an improvement in Mooney viscosity stability is improved with small amounts of gel. The elemental sulfur containing polychloroprene was prepared according to the recipe in Table V. In examples 5 and 6 the rosin was wood rosin, in example 7 it was tall oil rosin.

The sol employed in the blends of these examples was the latex prepared from Table V and contained antioxidant.

The gel portion of the blend was prepared according to the recipe in Table VI.

The blend ratios and Mooney viscosities of the blends on aging are set out in Table VII.

TABLE V
S-POLYCHLOROPRENE RECIPE

| | Parts by Weight |
|---|---|
| POLYMERIZATION CHARGE | |
| Water (total) | 150.000 |
| Sodium Hydroxide (100%) | 0.775 |
| Sodium Phosphate (Na$_3$PO$_4$) | 0.300 |
| Sodium salt of condensation product of formaldehyde and naphthalene sulfonic acid | 0.718 |
| Chloroprene | 100.000 |
| Rosin | 5.000 |
| Sulfur | 0.500 |
| PUMPED CATALYST | |
| Water | (95.400) |
| Potassium Persulfate | 4.500 [1] |
| Silver Salt | (0.115) |
| SHORTSTOP | |
| Water (total) | 3.399 |
| (100%) Dimethyl ammonium dimethyl dithiocarbamate (DDD) (100%) | Variable |
| ACETIC ACID (10%) | Variable[2] |
| PEPTIZING AGENT | |
| Water (total) | 8.510 |
| Sodium lauryl sulfate (100%) | 0.150 |
| Chloroprene | 6.150 |
| Phenothiazine | 0.00123 |
| (100%) Tetraethylthiuram dilsulfide | 2.300 |
| 2,2'-methylene-bis (4-methyl-6-t-butyl phenol) | 0.050 |
| CONDITIONS | |
| Polymerization Temperature, °C. | 40 (104° F.) |
| Polymerization Time, Hrs. | 5. (approx.) |
| Conversion, % | 84 |
| Solids (at 40° C.) at Shortstop | 34.6 |
| Peptization | 5 hr. at 40° C. + cooldown to less than 20° C. (68° F.) |
| Isolated by Freeze Roll | |

[1] These numbers are intended to represent a % mix and are not related to amount to be used. The catalyst will be used as required to maintain the polymerization rate.
[2] The pH of the latex is to be adjusted to 10.7 ± 0.05 prior to peptization.

TABLE VI
GEL RECIPE

| | Parts by Weight |
|---|---|
| POLYMERIZATION CHARGE | |
| Water (total) | 100.000 |
| NaOH (100%) | 0.540 |
| Lomar PW [1] | 0.700 |
| Na$_2$SO$_3$ | 0.300 |
| Chloroprene | 98.000 |
| Trimethyl propane trimethacrylate | 2.000 |
| Diethyl xanthogen disulfide | 0.575 |
| Disproportionated rosin [2] | 3.047 |
| CATALYST NO. 1[a] | |
| Water | 99.600 |
| Potassium Persulfate | 0.350[b] |
| Silver Salt | 0.070 |
| CATALYST NO. 2[a] | |
| Water | 95.400 |
| Potassium Persulfate | 4.500[b] |
| Silver Salt | 0.115 |
| SHORTSTOP | |
| Water | 0.800 |
| Lomar PW [1] | 0.010 |
| Sodium dodecyl benzene sulfonate | 0.020 |
| Chloroprene | 0.800 |
| Tertiary butylcatechol | 0.020 |
| Phenothiazine | 0.020 |
| CONDITIONS | |
| Polymerization Temperature, °C. | 40.0 |
| Polymerization Time, Hrs. | 3.5 to 4.0 |
| Conversion, % | 88.0 |
| Isolated by Freeze Roll | |

[a] Catalyst No. 1 solution to be used initially. Catalyst No. 2 solution to be used when reaction slows.
[b] These numbers are intended to represent a % mix and are not related to the amount to be usd. The catalyst will be used as requird to maintain the polymerization rate.
[1] Sodium salt of condensation product of formaldehyde and naphthalene sulfonic acid.
[2] Resin 731-SA, Hercules.

TABLE VII
EFFECT OF GEL CONTENT ON MOONEY STABILITY VS ORIGINAL BLEND MOONEY LEVEL

| Example | | Blend Ratio Sol:Gel | % Gel | Original ML1 + 2½ | Aged ML1 + 2½; Days @ 50° C. | | | |
|---|---|---|---|---|---|---|---|---|
| | | | | | 1 | 3 | 7 | 14 |
| 5 | 1 | 1:0 | 0 | 66.0 | 61.0 | 55.0 | 46.0 | 38.5 |
| | 2 | 39:1 | 2.5 | 66.5 | 61.5 | 54.0 | 45.0 | 39.0 |
| | 3 | 19:1 | 5.0 | 65.5 | 60.5 | 54.0 | 43.0 | 38.5 |
| | 4 | 9:1 | 10.0 | 69.0 | 66.0 | 60.5 | 54.0 | 50.0 |
| | 5 | 5:1 | 16.7 | 71.5 | 68.0 | 63.5 | 58.0 | 56.5 |
| | 6 | 4:1 | 20.0 | 72.0 | 69.0 | 66.0 | 63.0 | 64.5 |
| 6 | 1 | 1:0 | 0 | 48.5 | 44.0 | 41.0 | 36.5 | 31.5 |
| | 2 | 39:1 | 2.5 | 50.5 | 48.0 | 44.5 | 41.0 | 38.5 |
| | 3 | 19:1 | 5.0 | 45.0 | 41.5 | 39.0 | 35.0 | 32.5 |
| | 4 | 9:1 | 10.0 | 48.0 | 44.0 | 42.0 | 38.5 | 37.0 |
| | 5 | 5:1 | 16.7 | 48.5 | 46.5 | 43.0 | 42.0 | 39.0 |
| | 6 | 4:1 | 20.0 | 51.0 | 51.0 | 50.0 | 49.0 | 51.5 |
| 7 | 1 | 1:0 | 0 | 65.0 | 58.0 | 53.5 | 45.5 | 40.5 |
| | 2 | 39:1 | 2.5 | 67.5 | 59.0 | 55.5 | 48.0 | 41.5 |
| | 3 | 19:1 | 5.0 | 63.0 | 57.0 | 53.5 | 47.0 | 42.5 |
| | 4 | 9:1 | 10.0 | 60.0 | 57.5 | 55.0 | 52.0 | 51.5 |
| | 5 | 5:1 | 16.7 | 61.5 | 57.5 | 55.0 | 53.0 | 47.0 |
| | 6 | 4:1 | 20.0 | 57.0 | 52.5 | 50.5 | 48.5 | 46.5 |

The invention claimed is:

1. A polychloroprene sol-gel blend elastomer composition comprising an intimate mixture of:
a benzene-soluble polymer prepared by polymerizing polymerizable monomer comprising chloroprene in aqueous emulsion containing the chloroprene and 0.1 to 3 parts by weight elemental sulfur chain-transfer agent per 100 parts of monomer and peptizing the product of said polymerization with a peptizing agent containing the nucleus >[(N)(S)]≡C—S—, and a benzene-insoluble polymer prepared by polymerizing polymerizable monomer comprising at least 50 percent polychloroprene having present in the polymerization system from about 0.5 to 20 weight percent, based on total monomers of a triester having the general formula:

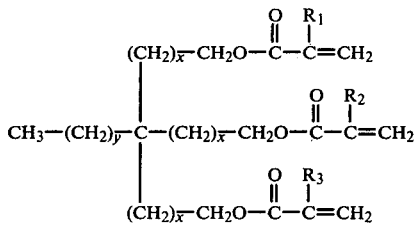

wherein x is 0 or an integer of from 1 to 4, y is 0 or an integer of from 1 to 4, and $R_1$, $R_2$ and $R_3$ represent hydrogen or an alkyl radical with from 1 to 4 carbon atoms.

2. The polychloroprene blend according to claim 1 wherein the soluble polymers are prepared by polymerizing monomer comprising at least 75 percent chloroprene.

3. The polychloroprene blend according to claim 2 wherein the weight ratio of benzene soluble polymer to benzene insoluble polymer is from 98:2 to 60:40.

4. The polychloroprene blend according to claim 3 wherein said ratio is 80:20 to 60:40.

5. The polychloroprene blend according to claim 1 wherein the elemental sulfur chain-transfer agent is present in an amount in the range from 0.10 to 3 parts by weight per 100 parts of total monomer.

6. The polychloroprene blend according to claim 5 wherein the amount of elemental sulfur is in the range of about 0.25 to 0.6 parts by weight per 100 parts of total monomer.

7. The polychloroprene blend according to claim 1 wherein a sulfur containing chain-transfer agent is present during the preparation of the benzene insoluble polymer.

8. The polychloroprene blend according to claim 7 where about 0.09 to 1.5 parts per hundred parts of total monomer of said chain-transfer agent are present in said benzene insoluble polymer preparation.

9. The polychloroprene blend according to claim 8 wherein said benzene insoluble polymer chain-transfer agent is selected from the group consisting of alkyl mercaptans, dialkyl xanthogen disulfides and polysulfides having the formula

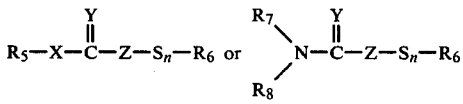

wherein X, Y and Z are selected from the group consisting of oxygen and sulfur, $R_5$ is a hydrocarbon radical having 1 to 8 carbon atoms, $R_6$ is a hydrocarbon radical having 1 to 8 carbon atoms or is a radical of the general structure

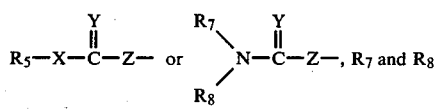

are selected from the group consisting of hydrocarbon radicals having 1 to 8 carbon atoms or hydrogen with at least one of $R_7$ and $R_8$ not being hydrogen and n is 1 to 4.

10. The polychloroprene blend according to claim 9 wherein said benzene insoluble polymer chain-transfer agent is a dialkyl xanthogen disulfide.

11. The polychloroprene blend according to claim 1 wherein said peptizing agent is selected from the group comprising of phenylethyl-carbamyl-dimethyl-dithiocarbamate; dimethyl-thiocarbamyl-thioacetyl-sulphide; dimethyl-thiocarbamyl-nitrophenyl-disulphide; benzothiazyl-dimethyl-dithiocarbamate; benzothiazyl-dimethyl-carbamyl-sulphide; benzothiazyl-furoylsulphide; mercapto-benzothiazol; tetrabutyl-thiuram-monosulphide; tetramethylthiuram-disulphide; dipentamethylene-thiuram-tetrasulphide; dimethyl carbamyl dimethyl dithiocarbamate; dinitro phenyl pentamethylene dithiocarbamate; tetraethyl thiuram disulphide; dipentamethylene thiuram disulphide; benzyl pentamethylene dithiocarbamate; diphenyl diethyl thiuram disulphide; phenyl dibutyl dithiocarbamate; tolyl phenyl ethyl dithiocarbamate; b-phenyl ethyl xylyl methyl dithiocarbamate; p-diphenyl diisoamyl dithiocarbamate; propyl dicetyl dithiocarbamate; crotonyl dicylohexyl dithiocarbamate; cetyl naphthyl methyl dithiocarbamate; b-naphthyl dipropyl dithiocarbamate; decyl benzyl ethyl dithiocarbamate; benzoyl diethyl dithiocarbamate; acetyl phenyl methyl dithiocarbamate; dibutyl carbamyl phenyl propyl dithiocarbamate; p-acetyl phenyl sulphur diallyl dithiocarbamate; 2-chloro-1-naphthyl sulphur dimethyl dithiocarbamate; dinaphthyl dimethyl thiuram monosulphide; dichlor diphenyl diethyl thiuram monosulphide; dinitro diphenyl dipropyl thiuram monosulphide; phenyl sodium sulphonate diethyl dithiocarbamate; nitro ortho diphenyl dimethyl dithiocarbamate; dipenthamethylene thiuram monosulphide; nitro naphthyl penamethylene dithiocarbamate; dinitro diphenyl dibutyl thiuram disulphide; distearyl dimethyl thiuram disulphide; tetraethyl thiuram disulphide; dinaphthyl dimethyl thiuram disulphide; tetraisopropyl thiuram tetra sulphide; tetrabrom diphenyl dimethyl thiuram tetra sulphide; tetrabutyl thiuram disulphide; potassium nitro benzothiazyl mercaptide; ammonium chloro nitro benzothiazyl mercaptide; ethyl benzothiazyl sulphide; cetyl benzothiazyl sulphide; crotonyl benzothiazyl sulphide; benzyl benzothiazyl sulphide; tolyl benzothiazyl sulphide; dinitro phenyl benzothiazyl sulphide; dibrom phenyl benzothiazyl sulphide; b-naphthyl benzothiazyl sulphide; nitro p-diphenyl benzothiazyl sulphide; benzoyl benzothiazyl sulphide; acetyl benzothiazyl sulphide; methyl tolyl carbamyl benzothiazyl sulphide; phenyl benzothiazyl disulphide; tetrabutyl thiocarbamyl benzothiazyl sulphide; chloro phenyl propyl thiocarbamyl nitro benzothiazyl sulphide; dinitro dibenzothiazyl disulphide; nitro dibenzothiazyl disulphide and chlor dinitro dibenzothiazyl disulphide.

12. A polychloroprene sol-gel blend elastomer composition comprising an intimate mixture of:

a benzene-soluble polymer prepared by polymerizing polymerizable monomer comprising chloroprene in aqueous emulsion containing chloroprene and 0.1 to 3 parts by weight elemental sulfur chain-transfer agent per 100 parts of monomer and peptizing the product of said polymerization with a peptizing agent and a benzene-insoluble polymer.

13. The polychloroprene blend according to claim 2 wherein the weight ratio of benzene soluble polymer to benzene insoluble polymer is from 98:2 to 60:40.

* * * * *

UNITED STATES PATENT AND TRADEMARK OFFICE
CERTIFICATE OF CORRECTION

PATENT NO. : 4,225,682
DATED : September 30, 1980
INVENTOR(S) : Hubert R. O'Neal It is certified that error appears in the above—identified patent and that said Letters Patent is hereby corrected as shown below:

Column 4, line 4 reads "dipenthamethylene" but should read -- dipentamethylene --

Column 4, line 20 reads "carbamnyl" but should read -- carbamyl --

Column 6, line 2 reads "compounds which are" but should read -- compounds are --

Column 9, lines 41-44, Table V, right hand column reads " (95.400)     but should read -- 95.400 ⎫
         4.500 >(1)                           4.500 ⎬ (1)
        ( 0.115)   "                          0.115 ⎭    --

Column 12, line 36 reads "dipenthamethylene" but should read -- dipentamentylene --

Column 12, line 37 reads "penamethylene" but should read -- pentamethylene --

Signed and Sealed this

Fourth Day of August 1981

[SEAL]

Attest:

GERALD J. MOSSINGHOFF

Attesting Officer    Commissioner of Patents and Trademarks